United States Patent [19]
Ness et al.

[11] Patent Number: 6,150,103
[45] Date of Patent: Nov. 21, 2000

[54] POLYETHYLENIMINE-BASED BIOMOLECULE ARRAYS

[75] Inventors: Jeffrey Van Ness, Seattle; John C. Tabone, Bothell; Kristen Moynihan, Seattle, all of Wash.

[73] Assignee: QIAGEN Genomics, Inc., Bothell, Wash.

[21] Appl. No.: 09/120,386

[22] Filed: Jul. 21, 1998

Related U.S. Application Data

[60] Provisional application No. 60/053,352, Jul. 22, 1997.
[51] Int. Cl.[7] .................................................. C12Q 1/68
[52] U.S. Cl. ........................ 435/6; 422/50; 422/68.1; 435/7.1; 736/501
[58] Field of Search .................. 422/50, 68.1; 435/6, 435/7.1; 436/501; 935/77, 78

[56] References Cited

U.S. PATENT DOCUMENTS

| | | | |
|---|---|---|---|
| 4,753,983 | 6/1988 | Ngo | 525/54.1 |
| 5,250,613 | 10/1993 | Bergstrom et al. | 525/54.1 |
| 5,756,050 | 5/1998 | Ershow et al. | 422/100 |

FOREIGN PATENT DOCUMENTS

| | | |
|---|---|---|
| 197 784 A1 | 10/1985 | European Pat. Off. . |
| 403 700 A1 | 12/1990 | European Pat. Off. . |
| 2 197 720 | 5/1988 | United Kingdom . |
| WO 92/07006 | 4/1992 | WIPO . |
| WO 94/00600 | 1/1994 | WIPO . |
| WO 95/02184 | 1/1995 | WIPO . |
| WO 95/09248 | 4/1995 | WIPO . |
| WO 95/25116 | 9/1995 | WIPO . |

OTHER PUBLICATIONS hhtp://chroma.mbt.washington.edu/mod_www/array.html, Hamilton MicroLab Arrayer, modular print head, Nov. 19, 1998 and hhtp://chroma.mbt.washington.edu/mod_www/hamilton.html, Modular Array Head, dated Mar. 17, 1998.

Schummer et al., "Inexpensive Handheld Device for the Construction of High–Density Nucleic Acid Arrays," *BioTechniques* 23: 1087–1092, 1997.

Alpert and Regnier, "Preparation Of A Porous Microparticulate Anion–Exchange Chromotography Support For Proteins," *Journal of Chromatography* 185: 375–392, 1979.

Blanchard et al., "High–density oligonucleotide arrays," *Biosensors & Bioelectronics* 11(6/7): 687–690, 1996.

Boussif et al., "A versatile vector for gene and oligonucleotide transfer into cells in culture and in vivo: Polyethylenimine," *Proc. Natl. Acad. Sci. USA* 92: 7297–7301, 1995.

Bruil et al., "Poly(ethyleneimine) modified filters for the removal of leukocytes from blood," *Journal of Biomedical Materials Research* 27: 1253–1268, 1993.

Chetverin and Kramer, "Oligonucleotide Arrays: New Concepts and Possibilities," *Bio/Technology* 12: 1093–1099, 1994.

D'Souza et al., "Immobilization of Yeast Cells By Adhesion To Glass Surface Using Polyethylenimine," *Biotechnology Letters* 8(9): 643–648, 1986.

(List continued on next page.)

*Primary Examiner*—Ardin H. Marschel
*Attorney, Agent, or Firm*—Seed Intellectual Property Law Group PLLC

[57] ABSTRACT

An array of biomolecules is formed from a solid substrate comprising a surface, where said surface is at least partially covered with a layer of poly(ethylenimine) (PEI), and the layer is divided among a plurality of discrete first regions abutted and surrounded by a contiguous second region. The first regions are defined by the presence of a biomolecule and PEI. The second region is defined by the presence of PEI and the substantial absence of the biomolecule. The array may be prepared by a process including the steps of providing a solid substrate having a surface, wherein a layer of poly(ethylenimine) (PEI) covers at least a portion of the surface. The layer contains a plurality of discrete first regions abutted and surrounded by a contiguous second region. The process includes the step of depositing a biomolecule into the first regions while maintaining the second region substantially free of the biomolecule.

60 Claims, 7 Drawing Sheets

OTHER PUBLICATIONS

Eggers et al., "Genosensors: microfabricated devices for automated DNA sequence analysis," *SPIE Advances in DNA Sequences Technology 189*: 113–126, 1993.

Ghosh and Musso, "Covalent attachment of oligonucleotides to solid supports," *Nucleic Acids Research 15*(13): 5353–5372, 1987.

Kremsky et al., "Immobilization of DNA via oligonucleotides containing an aldyhyde or carboxylic acid group at the 5' terminus," *Nucleic Acids Research 15*(7): 2891–2909, 1987.

Lipshutz et al., "Using Oligonucleotide Probe Arrays To Access Genetic Diversity," *BioTechniques 19*(3): 442–447, 1995.

O'Donnell–Maloney and Little, "Microfabrication and array technologies for DNA sequencing and diagnostics," *Genetic Analysis: Biomolecular Engineering 13*: 151–157, 1996.

Povey et al., "Trapping of Chemical Carcinogens with Magnetic Polyethyleneimine Microcapsules: I. Microcapsule Preparation and In Vitro Reactivity of Encapsulated Nucleophiles," *Journal of Pharmaceutical Sciences 75*(9): 831–837, 1986.

Povey et al., "Trapping of Chemical Carcinogens with Magnetic Polyethyleneimine Microcapsules: III. In Vivo Trapping of Electrophiles from N–Methyl–N–nitrosourea and Recovery from Feces," *Journal of Pharmaceuticals Sciences 76*(3): 201–207, 1987.

Rassi and Horváth, "High–Performance Liquid Chromatography of Nucleic Acid Constituents: Chromatographic Examination of Novel Stationary Phases," *Chromatographia 19*: 9–18, 1984.

Rounds et al., "Factors Contributing To Intrinsic Loading Capacity In Silica–Based Packing Materials For Preparative Anion–Exchange Protein Chromatography," *Journal of Chromatography 362*: 187–196, 1986.

Schena, "Genome analysis with gene expression microarrays," *BioEssays 18*(5): 427–431, 1996.

Schurer et al., "Polyethyleneimine As Tracer Particle For (Immuno) Electron Microscopy," *The Journal Of Histochemistry And Cytochemistry 25*(5): 384–387, 1977.

Southern et al., "Arrays of complementary oligonucleotides for analysing the hybridisation behaviour of nucleic acids," *Nucleic Acids Research 22*(8): 1368–1373, 1994.

Stipp, "The Idol of the Geeks," *Fortune 135*(40): p. 40, 1997.

Teletzke et al., "How Liquids Spread On Solids," *Chem. Eng. Comm. 55*: 41–81, 1987.

Trinh and Schnabel, "Ionic strength dependence of the stability of polyelectrolyte complexes," *Die Angewandte Makromolekulare Chemie 212*: 167–179, 1993.

Van Nessds and Chen, "The use of oligodeoxynucleotide probes in chaotrope–based hybridization solutions," *Nucleic Acids Research 19*(19): 5143–5151, 1991.

Van Ness et al., "A versatile solid support system for oligodeoxynucleotide probe–based hybridization assays," *Nucleic Acids Research 19*(12): 3345–3350, 1991.

Vanecek and Regnier, "Macroporous High–Performance Anion–Exchange Supports for Proteins," *Analytical Biochemistry 121*: 156–169, 1982.

Wasserman and Hultin, "High–Yield Method for Immobilization of Enzymes," *Biotechnology and Bioengineering XXII*(2): 271–287, 1980.

Layout of arrayed oligo solutions
(72 spots per grid)

Pattern produced when grids were
hybridized to the complement of oligo #1

Pattern produced when grids were
hybridized to the complement of oligo #2

Fluorescence illumination:

SEQUENCE LISTING

```
<160> NUMBER OF SEQ ID NOS: 5

<210> SEQ ID NO 1
<211> LENGTH: 30
<212> TYPE: DNA
<213> ORGANISM: Artificial Sequence
<220> FEATURE:
<223> OTHER INFORMATION: Reactive Oligonucleotide used in examples

<400> SEQUENCE: 1
gtcatactcc tgcttgctga tccacatctg                                    30

<210> SEQ ID NO 2
<211> LENGTH: 24
<212> TYPE: DNA
<213> ORGANISM: Artificial Sequence
<220> FEATURE:
<223> OTHER INFORMATION: Example Oligonucleotide used to hybridize to
      immobilized oligonucleotide in array

<400> SEQUENCE: 2
tgtggatcag caagcaggag tatg                                          24

<210> SEQ ID NO 3
<211> LENGTH: 38
<212> TYPE: DNA
<213> ORGANISM: Artificial Sequence
<220> FEATURE:
<223> OTHER INFORMATION: Example oligonucleotide immobilized on array

<400> SEQUENCE: 3
actactgatc aggcgcgcct tttttttttt tttttttt                           38

<210> SEQ ID NO 4
<211> LENGTH: 39
<212> TYPE: DNA
<213> ORGANISM: Artificial Sequence
<220> FEATURE:
<223> OTHER INFORMATION: Example oligonucleotide used to hybridize to
      immobilized oligonucleotide on array
```

-continued

```
<400> SEQUENCE: 4
aaaaaaaaaa aaaaaaaaaa ggcgcgcctg atcagtagt                              39

<210> SEQ ID NO 5
<211> LENGTH: 30
<212> TYPE: DNA
<213> ORGANISM: Artificial Sequence
<220> FEATURE:
<223> OTHER INFORMATION: Example oligonucleotide used to hybridize to
      immobilized oligonucleotide on array

<400> SEQUENCE: 5
cagatgtgga tcagcaagca ggagtatgac                                        30
```

POLYETHYLENIMINE-BASED BIOMOLECULE ARRAYS

CROSS-REFERENCE TO RELATED APPLICATION

The present application claims the benefit of U.S. Provisional Patent Application No. 60/053,352, filed Jul. 22, 1997, now abandoned.

TECHNICAL FIELD

This invention relates to an array of biomolecules, and more specifically to an array of discrete biomolecule-containing elements positioned throughout a polyethyleneimine layer overlying a substrate.

BACKGROUND OF THE INVENTION

In the fields of molecular biology and microbiology, it has long been common to employ solid supports having biomolecules immobilized thereon. Immobilization provides various advantages, such as, allowing for multiplexing of samples and ready measurements of tags employed in a large number of signal systems. There is, for example, a wealth of literature about conjugating nucleic acid polymers to beads.

One such method uses streptavidin-coated magnetic beads, which are commercially available from, e.g. Dynal of Oslo, Norway. These beads are contacted with terminally labeled biotinylated oligonucleotides. Biotin and streptavidin are well known to interact in a non-covalent but highly stable manner, which for many purposes is the functional equivalent of covalent conjugation. Thus, oligonucleotides may become immobilized on a bead through this biotin-streptavidin interaction.

Another method relies on carbodiimide chemistry. There are several variations on this basic approach. For example, hydrazide-coated beads may be joined to carboxy-modified oligonucleotides as described in. e.g. Kremsky, J. N. et al. *Nucleic Acids Res.* 15:2891–2909, 1987, via carbodiimide-promoted coupling. Another variation on this approach uses controlled pore glass (CPG) or magnetic polystyrene beads with a surface coating of carboxyl groups, which are reacted with amino-modified oligonucleotides, as described in, e.g., Ghosh, S. S. et al. *Nucleic Acids Res.* 15:5353–5372, 1987 and Lund V. et al. *Nucleic Acids Res.* 16:10861–10880, 1987.

Yet another method uses a layer of polyethyleneimine (PEI) that surrounds a bead. See, e.g., Wasserman, B. P. et al. *Biotech. and Bioeng.* XXII:271–287, 1980; Povey, A. C. et al. *J Pharmaceutical Sciences* 75:831–837, 1986; Rounds, M. A. J. Chrom. 362:187–196, 1986; Van Ness, J. et al. *Nucleic Acids Res.* 19:3345–3350, 1991; and PCT International Publication WO 94/00600. Furthermore, PEI has been used to immobilize various biomolecules, including nucleic acid polymers, on a wide variety of non-bead solid supports and surfaces See, e.g., Schurer, J. W. et al. *J. Histochemistry and Cytochemistry* 25:384–387, 1977; Alpert, A. J. et al. *J. Chrom.* 185:375–392, 1979; Vanecek, G. et al. *Anal. Biochem.* 121:156–169, 1982; El Rassi, Z. et al. *Chomatographia* 19:9–18, 1984; Rounds, M. A. *J. Chrom.* 362:187–196, 1986; European Patent Application No. 0,197, 784 A1 to Swann, W. E. et al., 1986; D'Souza, S. F. *Biotechnology Lett.* 8:643–648, 1986; Povey, A. C. et al. *J. Pharmaceutical Sciences* 76:201–207, 1987; U.S. Pat. No. 4,753,983 to Ngo, T. T., 1988; European Patent Application No. 0,403,700 A1 to Crane, L. J. et al, 1990; Trinh, C. K. *Die Angewandte Makromol. Chemie* 212:167–179, 1993; Bruil, A. et al *J. Biomed, Mat. Res.* 27:1253–1268, 1993; PCT International Publication No. WO 95/02184;. Indeed, PEI has been reported to bind oligonucleotides in the absence of a solid support. See, e.g., Boussif O. et al. *Proc. Natl. Acad. Sci. USA* 92:7297–7301, 1995.

Recently, intense attention has focused on creating arrays of biomolecules, and particularly polynucleotides, on a flat solid support. The following publications (and the references cited therein), which are exemplary only, provide general and specific overviews of various utilities for these biomolecular arrays, as well as methods of preparing such arrays: Eggers, M. D. et al. *Advances in DNA Sequencing Technology* SPIE Vol. 1891:113–126, 1993; Chetverin, A. B. et al. *Bio/Technology* 12:1093–1099, 1994; Southern, E. M. *Nucleic Acids Research* 22:1368–1373, 1994; Lipshutz, R. J. et al. *BioTechniques* 19:442–447, 1995; Schena, M. *BioEssays* 18:427–431, 1996; Blanchard, A. P. et al. *Biosensors & Bioelectronics* 11:687–690, 1996; O'Donnell-Maloney, M. J. et al. Genetic Analysis: *Biomolecular Engineering* 13:151–157, 1996; Regalado, A. *Start-Up* 24–30, Oct. 1996; and Stipp, D. *Fortune* pp. 30–41, Mar. 31, 1997.

Many of the reported procedures for preparing these arrays has drawn upon expertise which developed in connection with immobilizing biomolecules to beads and other solid supports. Perhaps surprisingly, there has been, to date, no report of using PEI to immobilize biomolecules in an array format. At most, this has been suggested as a theoretical possibility for linking oligonucleotides to a nylon support. See, e.g., PCT International Publication No. WO 95/09248, citing Van Ness. J. et al. *Nucleic Acids Res.* 19:3345–3350, 1991.

As disclosed herein, the present inventors have identified problems associated with preparing PEI-based oligonucleotide arrays, and have solved those problems, so that PEI-based arrays are now more than just a theoretical possibility. Furthermore, the PEI-based arrays of the invention provide various advantages compared to other types of arrays, as also disclosed herein.

SUMMARY OF THE INVENTION

The invention provides for an array of biomolecules comprising:

a solid substrate comprising a surface;

said surface at least partially covered with a layer of poly(ethylenimine) (PEI);

said layer comprising a plurality of discrete first regions abutted and surrounded by a contiguous second region;

said first regions defined by the presence of a biomolecule and PEI; and said second region defined by the presence of PEI and the substantial absence of the biomolecule.

As used herein, the first region is also called the implant region, because biomolecule is, in some sense, implanted into the PEI within the first regions. As also used herein, the second region is also called the spacer region or contiguous spacer region, because in fact the spacer regions serves an unreactive spacing, between reactive biomolecules in the implant regions.

In another aspect, the invention provides a process for preparing an array of biomolecules, said process comprising:

providing a solid substrate comprising a surface wherein a layer of poly(ethytenimine) (PEI) covers at least a portion of said surface, said layer comprising a plurality of discrete first regions abutted and surrounded by a contiguous second region; and depositing a biomolecule into said first regions while maintaining said second region substantially free of the biomolecule.

Other aspects of this invention will become apparent upon reference to the attached figures and the following detailed description.

DETAILED DESCRIPTION OF THE INVENTION

The present invention provides an array of biomolecules. The array includes a solid substrate having a surface which is preferably planar, where the surface is at least partially covered with a layer of poly(ethyleneimine) (PEI). The layer of PEI has a plurality of discrete first regions abutted and surrounded by a contiguous second region. The first regions are defined by the presence of a biomolecule and PEI, while the second region is defined by the presence of PEI and the substantial absence of the biomolecule, i.e., less than about $10^3$ biomolecules per 2,000 square microns of the second region.

Figure 1A:
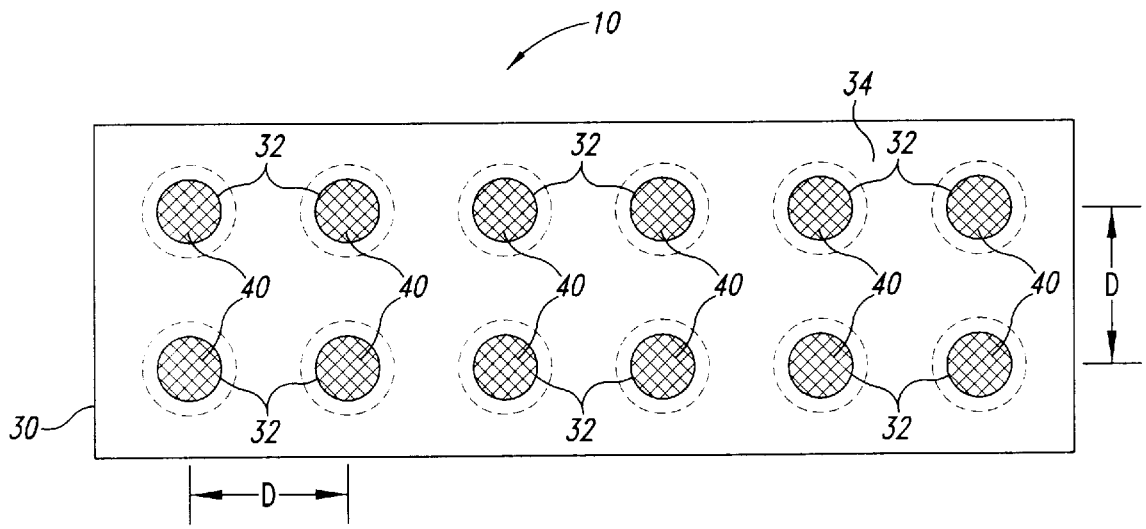
FIG. 1A is a schematic top plan view of an array in accordance with an embodiment of the invention.
Figure 1B:
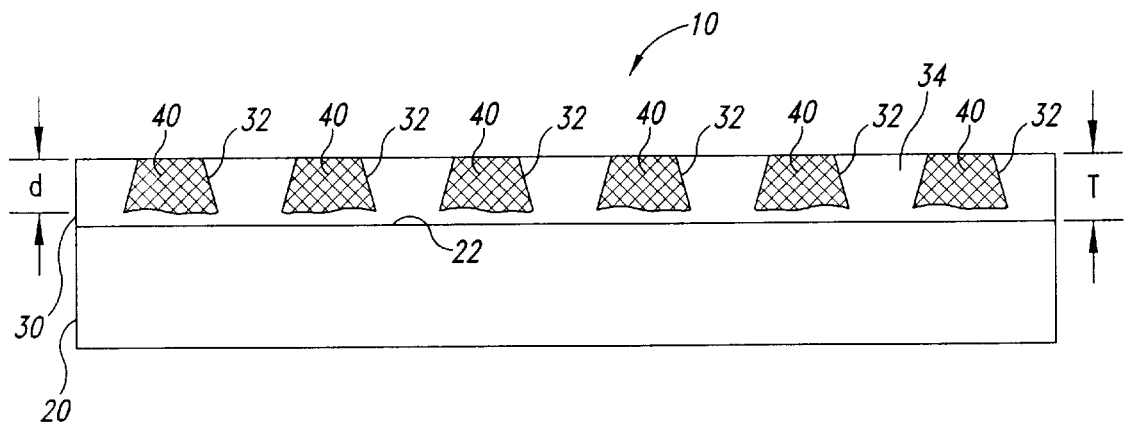
FIG. 1B is a schematic cross-sectional view of the array of FIG. 1A.

FIG. 1A is a schematic top plan view and FIG. 1B is a schematic cross-sectional view of a biomolecule array 10 in accordance with an embodiment of the invention. The array 10 may have solid base or support substrate 20 with a planar surface 22, and the array 10 may have a top layer 30 covering at least a portion of the support substrate 20. The top layer 30 is preferably composed of PEI and the bottom layer 20 is preferably composed of a rigid material to which PEI covalently bonds. The PEI layer 30 has a plurality of implant regions 32 (e.g., twelve as shown in FIG. 1A) disposed in a contiguous spacer region 34. Each implant region 32 is a discrete, isolated region defined by a mass of biomolecules 40 implanted into the PEI layer 30, and the spacer region 34 is defined by the remaining portion of the PEI layer 30. For example, each implant region 32 may have a truncated-conical shape extending from the surface of the top layer 30 to an intermediate depth "d" within the top layer 30. As described in detail below, the biomolecules 40 diffuse into the structure of the PEI layer 30 and covalently bond to reactive amine sites within the PEI layer 30.

The dimensions of the PEI layer 30, implant regions 32 and spacing between the implant regions 32 generally varies according to the specific application. The thickness T of the PEI layer 30, for example, may be a small as a single layer of PEI molecules. Additionally, the implant regions are generally about 10–100 μm in diameter at the surface of the PEI layer 30, and the center-to-center distance "D" between the implant regions 32 is generally between 100 μm and 1,000 μm. In a preferred embodiment, the surface diameter of the implant regions 32 is approximately 50 μm, and the implant regions 32 are spaced apart by a center-to-center distance D of approximately 200 μm.

Solid Substrate

The substrate is preferably glass or silicon. However, the substrate may alternatively be quartz, gold, synthetic organic polymers such as polyethylene, mylar and 6,6-nylon, or composites thereof. In a preferred embodiment, the substrate is planar. In another preferred embodiment, the substrate be formed of wells or other indentations distributed throughout an otherwise planar surface. The substrate may have the morphology of a non-porous material, or it may be porous such as nylon. The substrate may be a membrane or a film (mylar or gold, for example). Essentially any solid substrate may be employed which allows the formation and retention of PEI- and biomolecule-containing regions surrounded by a PEI-containing biomolecule-free region.

An example of a solid support that is useful for this purpose is a silicon wafer that is typically used in the electronics industry in the construction of semiconductors. The wafers are highly polished and reflective on one side and can be easily coated with poly(ethylenimine) using silane chemistries. The wafers are commercially available from companies such as WaferNet (San Jose. Calif.). Glass slides can also be coated with a reflective coating. Glass slides with a reflective coating can also be easily coated with poly(ethylenimine) using silane chemistries.

The polymer coating of poly(ethylenimine) permits the covalent attachment of oligonucleotides, PCR fragments or amplicons, DNA molecules or fragments or other amine-containing biomolecules to the solid support using commercially available cross-linkers (Pierce, Rockford, Ill.). Poly (ethylenimine) (PEI) coated slides also have the added benefit of long shelf life stability.

Preparation of PEI Coatings

The chemistry used to adhere the layer of PEI to the substrate depends, in substantial part, upon the chemical identity of the substrate. The prior art provides numerous examples of suitable chemistries that may adhere PEI to a solid support. For example, when the substrate is 6,6-nylon, the PEI coating may be applied by the methods disclosed in Van Ness, J. et al. *Nucleic Acids Res.* 19:3345–3350, 1991 and PCT International Publication WO 94/00600, both of which are incorporated herein by reference. When the solid support is glass or silicon, suitable methods of applying a layer of PEI are found in, e.g., Wasserman, B. P. *Biotechnology and Bioengineering* XXII:271–287, 1980; and D'Souza, S. F. *Biotechnology Letters* 8:643–648, 1986.

Preferably, the PEI coating is covalently attached to the solid substrate. When the solid substrate is glass or silicon, the PEI coating may be covalently bound to the substrate using silylating chemistry. For example, PEI having reactive siloxy endgroups is commercially available from Gelest, Inc. (Tullytown, Pa.). Such reactive PEI may be contacted with a glass slide or silicon wafer, and after gentle agitation, the PEI will adhere to the substrate. Alternatively, a bifunctional silylating reagent may be employed. According to this process, the glass or silicon substrate is treated with the bifunctional silylating reagent to provide the substrate with a reactive surface. PEI is then contacted with the reactive surface, and covalently binds to the surface through the bifunctional reagent.

PEI coatings have been extensively used in the art for binding biomolecules. PEI is very effective in this capacity for a variety of reasons. For instance, PEI is very hydrophilic and thus readily wets aqueous solutions containing biomolecules. In addition, PEI contains many amino groups, which can form salts with acidic groups in a biomolecule. However, the readiness with which PEI accepts aqueous solutions of biomolecules is precisely why it has not, to date, seen use in the preparation of biomolecular arrays. When aqueous biomolecular solutions are placed on a layer of PEI, the solution rapidly wicks throughout the PEI coating rather that staying in a discrete location. Because the solutions wick, solutions placed in an array format simply merge together and form a single reactive area, which is precisely what is to be avoided in the preparation of biomolecular arrays.

Arraying Solutions

The present inventors have discovered how to prepare biomolecular arrays with PEI coatings. The inventive approach employs a composition, also called an "arraying solution" containing a thickening agent at a concentration of about 35 vol % to about 80 vol % based on the total volume of the composition, a biomolecule which is preferably an oligonucleotide at a concentration ranging from 0.001 µg/mL to 10 µg/mL, and water. It has been surprisingly discovered that when a thickening agent is contained within an aqueous oligonucleotide composition, the thickening agent imparts desirable rheological properties to the composition, thus enabling the composition to be used with the modified spring probes disclosed herein, to deliver multiple uniform microdroplets to a planar surface having a PEI coating, with only a single pickup of the composition from the reservoir of composition.

The concentration of the thickening agent is 35% V/V to 80% V/V for liquid thickening agents such as glycerol. The preferred concentration of thickening agent in the composition depends, to some extent, on the temperature at which the arraying is performed. The lower the arraying temperature, the lower the concentration of thickening agent that needs to be used. The combination of temperature and viscosity control permits arrays to be made on most types of solid supports (e.g., glass, wafers, nylon 6/6, nylon membranes, etc.).

The presence of a thickening agent has the additional benefit of allowing the concurrent presence of low concentrations of various other materials to be present in combination with the biomolecule. For example 0.001% V/V to 1% V/V of detergents may be present in the arraying, solution. This is useful because PCR buffer contains a small amount of Tween-20 or NP-40, and it is frequently desirable to array sample nucleic acids directly from a PCR vial without prior purification of the amplicons. The use of a thickening agent permits the presence of salts (for example NaCl, KCl, or $MgCl_2$), buffers (for example Tris), and/or chelating reagents (for example EDTA) to also be present in the arraying solution. The use of a thickening agent also has the additional benefit of permitting the use of cross-linking reagents and/or organic solvents to be present in the arraying solution. As commercially obtained, cross-linking reagents are commonly dissolved in organic solvent such as DMSO, DMF, NMP, methanol, ethanol and the like. Commonly used organic solvents can be used in arraying solutions of the invention at levels of 0.05% to 20% (V/V) when thickening agents are used.

In general, the thickening agents impart increased viscosity to the arraying solution. When a proper viscosity is achieved in the arraying solution, the first drop is the substantially the same size as, for example, the 100th drop deposited. When an improper viscosity is used in the arraying solution, the first drops deposited are significantly larger than latter drops which are deposited. The desired viscosity is between those of pure water and pure glycerin.

The arraying solutions of the present invention may be used to deposit microdroplets onto almost any surface. Since, the surface property of the solid support has little or no effect on the deposition of the microdroplet, biological samples can be arrayed onto almost any type of coated surface or polymer-coated solid support. For example, typical aqueous solutions tend to spread rapidly on solid supports which are coated with hydrophilic polymers such as poly(lysine) or poly(ethylenimine) whereas these same solutions tend not to be easily deposited on hydrophobic surfaces such as silicon wafers. However, arraying solutions with a thickening agent according to the resent invention may be used to deposit uniform microdots on any of these substrates.

Another important benefit of including a thickening agent such as glycerol in the arraying process is quality control. When glycerol, for example, is used in the arraying method as described herein, a small droplet of liquid is deposited on the solid support. At the concentrations commonly used in the methods described here, the glycerol concentration is sufficient to prevent evaporation of the microdroplet. Therefore, each printing of each array pin can be examined prior to chemical processing of the array. The ability to visualize microdroplets substantially enhances the ability to perform quality control with respect to the arraying process. This leads to a substantial increase in value in the arraying methodology.

The biomolecule may be a nucleic acid polymer or analog thereof, such as PNA, phosphorothioates and methylphosphonates. Nucleic acid refers to both ribonucleic acid and deoxyribonucleic acid. The biomolecule may comprise unnatural and/or synthetic bases. The biomolecule may be single or double stranded nucleic acid polymer.

A preferred biomolecule is an nucleic acid polymer, which includes oligonucleotides (up to about 100 nucleotide bases) and polynucleotides (over about 100 bases). A preferred nucleic acid polymer is formed from 15 to 50 nucleotide bases. Another preferred nucleic acid polymer has 50 to 1,000 nucleotide bases. The nucleic acid polymer may be a PCR product, PCR primer, or nucleic acid duplex, to list a few examples. However, essentially any nucleic acid type can be covalently attached to a PEI-coated surface when the nucleic acid contains a primary amine, as disclosed below. The typical concentration of nucleic acid polymer in the arraying solution is 0.001–10 µg/mL, preferably 0.01–1 µg/mL, and more preferably 0.05–0.5 µg/mL.

Preferred nucleic acid polymers are "amine-modified" in that they have been modified to contain a primary amine at the 5'-end of the nucleic acid polymer, preferably with one or more methylene (—$CH_2$—) groups disposed between the primary amine and the nucleic acid portion of the nucleic acid polymer. Six is a preferred number of methylene groups. Amine-modified nucleic acid polymers are preferred because they can be covalently coupled to a solid support through the 5'-amine group. PCR products can be arrayed using 5'-hexylamine modified PCR primers. Nucleic acid duplexes can be arrayed after the introduction of amines by nick translation using allyl-dUTP (Sigma, St. Louis, Mo.). Amines can be introduced into nucleic acids by polymerases such as terminal transferase or by ligation of short amine-containing nucleic acid polymers onto nucleic acids by ligases.

Preferably, the nucleic acid polymer is activated prior to be contacted with the PEI coating. This can be conveniently accomplished by combining amine-functionalized nucleic acid polymer with a multi-functional amine-reactive chemical such as trichlorotriazine. When the nucleic acid polymer contains a 5'-amine group, that 5'-amine can be reacted with trichlorotriazine, also known as cyanuric chloride (Van Ness et al., *Nucleic Acids Res.* 19(2):3345–3350, 1991) Preferably, an excess of cyanuric chloride is added to the nucleic acid polymer solution, where a 10- to 1000-fold molar excess of cyanuric chloride over the number of amines in the nucleic acid polymer in the arraying solution is preferred. In this way, the majority of amine-terminated nucleic acid polymers have reacted with one molecule of trichlorotriazine, so that the nucleic acid polymer becomes terminated with dichlorotriazine.

An advantageous feature of the present invention is that the biomolecule-containing arraying solutions may be deposited onto a PEI coating even though that arraying solution contains a significant amount of trichlorotriazine. This provides a significant advantage over methods wherein coupling agent needs to be removed from an arraying solution prior to an arraying process.

When the nucleic acid polymer is double stranded, a preferred embodiment of the invention provides that both strands or one of the strands contains a terminal amino group. The double stranded nucleic acid polymer may be bonded through one terminal amino group to the PEI coating, to thereby immobilize the double stranded polymer. However, since only one of the two strands is covalently bonded to the PEI coating, the other strand may be removed under denaturing and washing conditions. This approach provides one convenient method according to the present invention of achieving an array of single stranded nucleic acid polymers. The double stranded nucleic acid polymer may be obtained, for example, as a reaction product from PCR.

Preferably, the arraying solution is buffered using a common buffer such as sodium phosphate, sodium borate, sodium carbonate, or Tris HCl. A preferred pH range for the arraying solution is 7 to 9, with a preferred buffer being freshly prepared sodium borate at pH 8.3 to pH 8.5.

To prepare a typical arraying solution, hexylamine-modified nucleic acid polymer is placed in 0.2 M sodium borate, pH 8.3, at 0.1 μg/mL, to a total volume of 50 μl. Ten μl of a 15 mg/mL solution of cyanuric chloride is then added, and the reaction is allowed to proceed for 1 hour at 25 C with constant agitation. Glycerol (Gibco Brl®. Grand Island. N.Y.) is added to a final concentration of 56%.

Printing Techniques

The biomolecular solutions may be applied to the PEI coating by any of the number of techniques currently used in microfabrication. For example, the solutions may be placed into an ink jet print head, and ejected from such a head onto the coating.

Figures 2A, 2B:
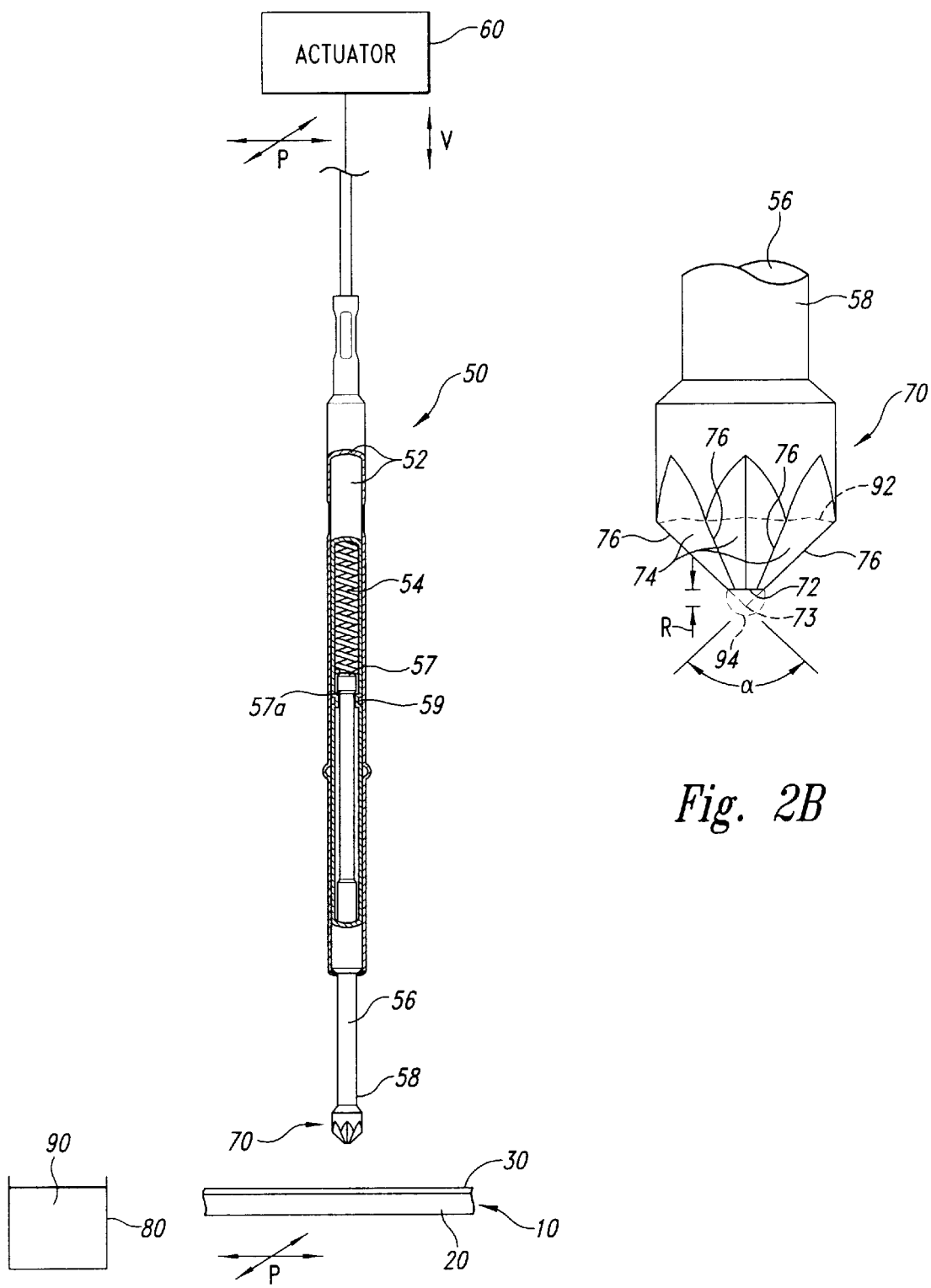
FIG. 2A is an isometric view of a delivery apparatus for preparing the arrays of the invention.
FIG. 2B is an enlarged front elevational view of an embodiment of a delivery tip in accordance with the invention.

FIG. 2A is an isometric view showing a preferred apparatus and method for selectively delivering discrete, controlled volumes of a biomolecular solution onto the PEI layer 30 of the array 10. In one embodiment, the apparatus has a spring probe 50 operatively attached to an actuator 60 and a delivery tip 70 attached to an opposing end of the spring probe 50. The spring probe 50 generally includes a housing 52 encasing a biasing member 54 and a plunger 56 with a first end 57 adjacent to the biasing member 54 and a second end 58 projecting from the housing 52. The housing 52 may be a tubular barrel, and the biasing member 54 may be a compression spring that pushes the second end 58 of the plunger 56 out from the housing 52. The first end 57 of the plunger 56 according has a shoulder 57a that engages a stop 59 projecting radially inwardly from the housing 52 to limit the maximum extension of the plunger 56 with respect to the housing 52. Suitable spring probes 50 are available from Everett Charles (Pomona, Calif.), Interconnect Devices, Inc. (Kansas City, Kan.), Test Connections, Inc., (Upland, Calif.), and other manufacturers.

The actuator 60 preferably moves the spring probe 50 along an axis normal to the array 10 (indicated by arrow V) and in a plane parallel to the surface of the PEI layer 30 (indicated by arrow P). The actuator 60 accordingly controls the spring probe 50 to dip the delivery tip 70 into a well 80 containing a biomolecular fluid 90, position the spring probe 50 over a desired point of the PEI layer 30, and press the tip 70 against the desired point of the PEI layer 30. In another embodiment, the actuator 60 may only move the spring probe 50 normal to the array 10, and another actuator (not shown) translates the array 10 and the well 80 to position the tip 70 over the well 80 or a desired point of the PEI layer 30. The actuator 60 is preferably a robot or other computer controlled handling device that robotically delivers the biomolecular solution to the PEI layer 30. Additionally a plurality of spring probes 50 may be attached to a single actuator to simultaneously deliver a plurality of biomolecule masses to the PEI layer 30.

The delivery tip 70 preferably draws a sufficient volume of biomolecular fluid 90 onto its surface to deliver a plurality of biomolecular masses onto the PEI layer 30 and form a corresponding plurality of implant regions 32 (shown in FIG. 1A) with a single pick-up step. FIG. 2B is an enlarged front elevational view of a delivery tip 70 in accordance with one embodiment of the invention. The delivery tip 70 preferably has a truncated-conical shape with a distal face 72 and a plurality of flutes or channels 74. The distal face 72 may be a flat surface recessed from an imaginary intersecting point 73 by a distance "R" between approximately 0.00001 in and 0.010 in, and more preferably between approximately between 0.001 in and 0.005 in. Additionally, the flutes 74 have vanes or ridges 76 converging toward the distal face 72 at an angle α between approximately 15° and 120°, and more preferably between 60° and 90°.

The spring probe 50, actuator 60 and delivery tip 70 operate together to deliver a controlled amount of biomolecular fluid to the PEI layer 30 each time the actuator 60 presses the delivery tip 70 against the PEI layer 30. The actuator 60 initially dips the delivery tip 70 into the well 80 of biomolecular fluid 90 to draw and hold a significant volume of biomolecular fluid 92 (FIG. 2B) onto the delivery tip 70 via capillary action. The actuator 60 then positions the spring probe 50 over the PEI layer 30. After removing the tip 70 from the well 80, a portion of the biomolecular fluid 92 on the tip 70 forms a hanging mass 94 of fluid at the distal face 72 of the tip. The actuator then presses the tip 70 against the PEI layer to form a single, discrete implant region 32 (shown in FIGS. 1A and 1B) of the array 10 from a portion of the biomolecular fluid on the tip 70. The actuator 60 preferably presses the tip 70 against the PEI layer 30 so that the tip 70 contacts the PEI layer 30 with a nominal amount of pressure. However, it is difficult consistently press the tip 70 against the PEI layer 70 with the same pressure because the actuator 60 may not always position the tip 70 at the same elevation and the surface of the PEI layer 70 may not be uniformly planar. The biasing member 54 accordingly stores energy caused by pressing the tip 70 against the PEI layer 30 permitting the spring probe 50 to contact the PEI layer 30 with a substantially constant pressure for each delivery irrespective of minor irregularities in the stroke of the actuator 60 or the topography of the PEI layer 30.

The delivery system described above accordingly provides an apparatus that can deliver a consistent implant volume of biomolecular fluid each time the tip 70 engages the PEI layer 30. It will be appreciated that a precise, consistent volume of biomolecular fluid should be delivered to the PEI layer 30 at each implant region 32 to maintain the spacer region 34 in the PEI layer 30. The quantity of biomolecular fluid implanted into the PEI layer 30 at an implant region 32 is generally determined empirically, and it is a function the time that the tip 70 engages the PEI layer 30, the viscosity of the biomolecular fluid 90, the configuration of the tip 70, and the pressure between the tip 70 and the PEI layer 30. Because the biasing member 54 provides a substantially constant pressure between the tip 70 and the PEI layer 30, the primary factor influencing the quantity of biomolecular fluid delivered to the PEI layer 30 is the time that the tip 70 engages the PEI layer 30.

Figure 3:
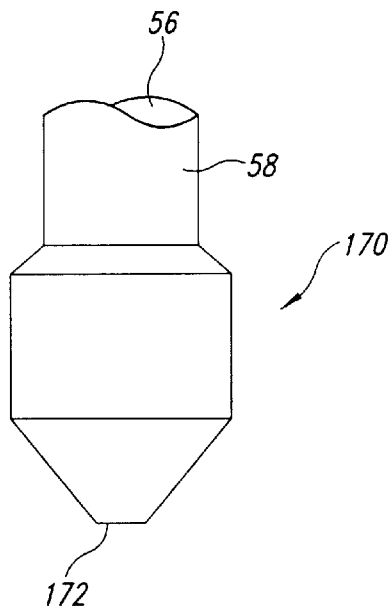
FIG. 3 is a front elevational view of another delivery tip with a conical design.

FIG. 3 is a front elevational view of another embodiment of a delivery tip 170 in accordance with the invention. In this embodiment, the delivery tip 170 has a truncated-conical shape without flutes or vanes. Accordingly, the delivery tip 170 holds the biomolecular fluid on the surface of the conical section of the tip. Although the delivery tip 170 may be used to deliver biomolecular fluid to the PEI layer 30, it is generally more desirable to use a fluted tip because such tip hold more biomolecular fluid.

Figures 4A, 4B:
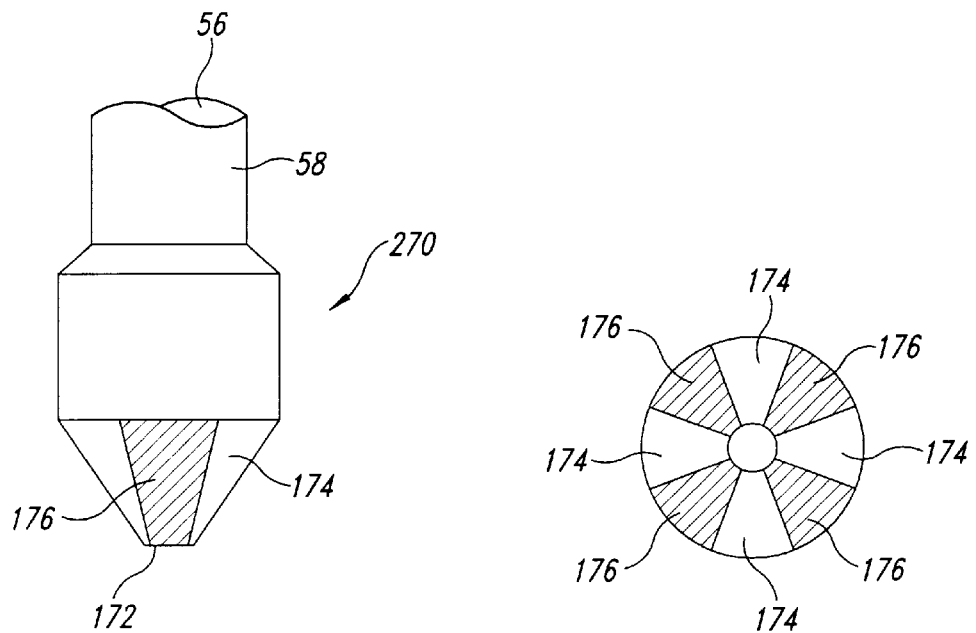
FIG. 4A is a front elevational view of yet another embodiment of a delivery tip with a fluted, conical design in accordance with another embodiment of the invention.
FIG. 4B is a bottom plan view of the delivery tip of FIG. 4A.

FIG. 4A is a front elevational view and FIG. 4B is a bottom plan view of yet another embodiment of a delivery tip 270 with a plurality of flutes 274 and vanes 276. The delivery tip 270 operates in substantially the same manner as the tip 70 described above, and thus it also provides substantially the same advantages.

The delivery tips 70, 170 and 270 described above represent a few examples of delivery tips that may be used to implant biomolecular fluid into the PEI layer 30. It will be appreciated that several modifications of the tips may be made, including using different shapes a distal face designs. For example, the tips may have pyramidal, cylindrical, cubical or other suitable shapes depending upon the particular application. Additionally, the flutes may have configurations other than those shown in the present figures. Thus, the delivery tips are not necessarily limited to those illustrated in FIGS. 2B–4B.

Arraying Conditions and Post-arraying Treatments

The arraying solutions as described above may be used directly in an arraying process. That is, in a preferred embodiment for arraying nucleic acid polymers, the activated nucleic acid polymers are not purified away from unreacted cyanuric chloride prior to the printing step. It has been surprisingly discovered that there is no need to remove the excess crosslinker prior to printing in the arraying method. That is, the excess cyanuric chloride in the reaction mixture does not interfere or compete with the covalent attachment of the nucleic acid polymers to a PEI coated solid support. This is because there is an excess of amines on the solid support over the number of cyanuric chloride molecules that will be arrayed at any given volume (nanoliters to picoliters).

Typically the reaction which attaches the activated nucleic acid to the solid support is allowed to proceed for 1 to 20 hours at 20 to 50 C. Preferably, the reaction time is 1 hour at 25 C.

The arrays of the present invention are particularly useful in conducting hybridization assays. However, in order to perform such assays, the amines on the solid support must be capped prior to conducting the hybridization step. This may be accomplished by reacting the solid support with 0.1–2.0 M succinic anhydride. The preferred reaction conditions are 1.0 M succinic anhydride in 70% m-pyrol and 0.1 M sodium borate. The reaction typically is allowed to occur for 15 minutes to 4 hours with a preferred reaction time of 30 minutes at 25 C. Residual succinic anhydride is removed with a 3× water wash.

The solid support is then incubated with a solution containing 0.1–5 M glycine in 0.1–10.0 M sodium borate at pH 7–9. This step "caps" any dichloro-triazine which may be covalently bound to the PEI surface by conversion into monochlorotriazine. The preferred conditions are 0.2 M glycine in 0.1 M sodium borate at pH 8.3. The solid support may then be washed with detergent-containing solutions to remove unbound materials, for example, trace NMP. Preferably, the solid support is heated to 95 C. in 0.01 M NaCl, 0.05 M EDTA and 01 M Tris pH 8.0 for 5 minutes. This heating step removes non-covalently attached nucleic acid polymers, such as PCR products. In the case where double strand nucleic acid are arrayed, this step also has the effect of converting the double strand to single strand form (denaturation).

The arrays are may be interrogated by probes (e.g., oligonucleotides, nucleic acid fragments, PCR products, etc.) which are biotinylated. The methods for biotinylating nucleic acids are well known in the art and are adequately described by Pierce (Avidin-Biotin Chemistry: A Handbook, Pierce Chemical Company, 1992, Rockford Ill.). Probes are generally used at 0.1 ng/mL, to 10/μg/mL in standard hybridization solutions that include GuSCN, GuHCl, formamide, etc. (see Van Ness and Chen, *Nucleic Acids Res.*, 19:5143–5151, 1991).

To detect the hybridization event (i.e., the presence of the biotin), the solid support is incubated with streptavidin/horseradish peroxidase conjugate. Such enzyme conjugates are commercially available from, for example, Vector Laboratories (Burlingham, Calif.). The streptavidin binds with high affinity to the biotin molecule bringing the horseradish peroxidase into proximity to the hybridized probe. Unbound streptavidin/horseradish peroxidase conjugate is washed away in a simple washing step. The presence of horseradish peroxidase enzyme is then detected using a precipitating substrate in the presence of peroxide and the appropriate buffers.

A blue enzyme product deposited on a reflective surface such as a wafer has a many-fold lower level of detection (LLD) compared to that expected for a colorimetric substrate. Furthermore, the LLD is vastly different for different colored enzyme products. As shown in Example 5, the LLD for 4-methoxy-napthol (which produces a precipitated blue product) per 50 μM diameter spot is approximately 1000 molecules, whereas a red precipitated substrate gives an LLD about 1000-fold higher at 1,000,000 molecules per 50 $\mu$M diameter spot. The LLD is determined by interrogating the surface with a microscope (such as the Axiotech microscope commercially available from Zeiss) equipped with a visible light source and a CCD camera (Princeton Instruments, Princeton, N.J.). An image of approximately 10,000 $\mu$M×10,000 $\mu$M can be scanned at one time.

In order to use the blue colorimetric detection scheme, the surface must be very clean after the enzymatic reaction and the wafer or slide must be scanned in a dry state. In addition, the enzymatic reaction must be stopped prior to saturation of the reference spots. For horseradish peroxidase this is approximately 2–5 minutes.

It is also possible to use chemiluminescent substrates for alkaline phosphatase or horseradish peroxidase (HRP), or fluorescence substrates for HRP or alkaline phosphatase. Examples include the diox substrates for alkaline phosphatase available from Perkin Elmer or Attophos HRP substrate from JBL Scientific (San Luis Obispo, Calif.).

Robotic Delivery of Biomolecule Solution

The invention provides a method for depositing a biomolecule onto a solid support, which includes the steps of: immersing a tip of a spring probe into a solution of biomolecule; removing the tip from the solution to provide biomolecule solution adhered to the tip; and contacting the biomolecule solution with a solid support to thereby transfer biomolecule solution from the tip to the solid support. In a preferred embodiment, the contacting step is accomplished robotically. In other words, a precision robotic system which can be controlled in the x, y and z axis. A precision Cartesian robotic system would consist of linear positioning tables coupled with the appropriate motors, amplifiers, motion controller, personal computer and software to drive the tables. Precision linear positioning tables are available from Parker Hannifin Corporation (Daedel Division, Harrison City, Pa.) or THK Company, Ltd. (Tokyo, Japan). Motors, amplifiers, and motion controllers are available from Parker Hannifin Corporation (Daedel Division, Harrison City, Pa.) or Galil Motion Control, Inc. (Mountain View, Calif.). Software would mostly likely be custom and could be written in a language such as Borland C++ 4.5 (Borland International Inc., Scotts Valley, Calif.) or Visual Basic 4.0 (Microsoft Corporation, Redmond, Wash.). Personnel computers are available from numerous manufacturers such as Dell Computer Corporation (Austin, Tex.).

Spring probes as described above are manufactured to be mounted into any of several styles of receptacle, and robots useful in the present invention contain suitably sized receptacles to accept the spring probe. Preferred receptacles are made from nickel-silver or bronze, then gold plated over hard nickel. A design for a preferred receptacle is a metal tube with diameter 1.5 mm to 2.0 mm, more preferably 1.68 millimeters. A square wire 0.5 mm to 1 mm thick, more preferably 0.64 mm thick is crimped into one end of the tube and sealed. Each receptacle is manufactured with an indent and press ring to hold a spring probe securely. The probe is inserted into the receptacle so the barrel of the probe is flush with the receptacle end.

A mounting head is mounted onto a robot for the purpose of arraying liquid. The head has a bar which is interchangeable for various printing applications. Bars can be easily changed by removing two screws, and replacing one bar designed for arraying from a 96 well plate with one designed to hold spring probes designed to array from a 384 well plate, for example. The receptacles are held in the bar by friction using precision-drilled, bi-level holes to fit the wire wrap and crimped region of the receptacle snugly. This design allows easy replacement of damaged or poorly performing receptacle and/or spring probes. Once inserted, the receptacle/spring probe unit extends down from the bar a distance of 25 mm, thus allowing the probe to reach the bottom of the microtiter plate holding a sample liquid to be arrayed.

Arrays

The biomolecule arrays of the present invention contain a solid substrate comprising a surface, where the surface is at least partially covered with a layer of poly(ethylenimine) (PEI). The PEI layer comprises a plurality of discrete first regions abutted and surrounded by a contiguous second region. The first regions are defined by the presence of a biomolecule and PEI, while the second region is defined by the presence of PEI and the substantial absence of the biomolecule. Preferably, the substrate is a glass plate or a silicon wafer. However, the substrate may be, for example, quartz, gold, nylon-6,6, nylon or polystyrene, as well as composites thereof, as described above.

The PEI coating preferably contains PEI having a molecular weight ranging from 100 to 100,000. A reaction product of a bifunctional coupling, agent may be disposed between the substrate surface and the PEI coating, where the reaction product is covalently bonded to both the surface and the PEI coating, and secures the PEI coating to the surface. The bifunctional coupling agent contains a first and a second reactive functional group, where the first reactive functional group is, for example, a tri(O—$C_1$–$C_5$alkyl)silane, and the second reactive functional group is, for example, an epoxide, isocyanate, isothiocyanate and anhydride group. Preferred bifunctional coupling agents include 2-(3,4-epoxycyclohexyl)ethyltrimethoxysilane; 3,4-epoxybutyltrimethoxysilane; 3-isocyanatopropyltriethoxysilane, 3-(triethoxysilyl)-2-methylpropylsuccinic anhydride and 3-(2,3-epoxypropoxy)propyltrimethoxysilane.

The array of the invention contains first, biomolecule-containing regions, where each region has an are within the range of about 1,000 square microns to about 100,000 square microns. In a preferred embodiment, the first regions have areas that range from about 5,000 square microns to about 25,000 square microns.

The first regions are preferably substantially circular, where the circles have an average diameter of about 10 microns to 200 microns. Whether circular or not, the boundaries of the first regions are preferably separated from one another (by the second region) by an average distance of at least about 25 microns, however by nor more than about 1 cm (and preferably by no more than about 1,000 microns). In a preferred array, the boundaries of neighboring first regions are separated by an average distance of about 25 microns to 100 microns, where that distance is preferably constant throughout the array, and the first regions are preferably positioned in a repeating geometric pattern as shown in the Figures attached hereto. In a preferred repeating geometric pattern, all neighboring first regions are separated by approximately the same distance (about 25 microns to about 100 microns).

In preferred arrays, there are from 10 to 50 first regions on the substrate. In another embodiment, there are 50 to 400 first regions on a substrate. In yet another preferred embodiment, there are 400 to 800 first regions on the substrate.

The biomolecule located in the first regions is preferably a nucleic acid polymer. A preferred nucleic acid polymer is an oligonucleotide having from about 15 to about 50 nucleotides. The biomolecule may be amplification reaction products having from about 50 to about 1,000 nucleotides.

In each first region, the biomolecule is preferably present at an average concentration ranging from $10^5$ to $10^9$ biomolecules per 2,000 square microns of a first region. More preferably, the average concentration of biomolecule ranges from $10^7$ to $10^9$ biomolecules per 2,000 square microns. In the second region, the biomolecule is preferably present at an average concentration of less than $10^9$ biomolecules per 2,000 square microns of said second region, and more preferably at an average concentration of less than $10^2$ biomolecules per 2,000 square microns. Most preferably, the second regions does not contain any biomolecule.

The invention has great utility for a number of biotechnological applications, specifically those methods relating to developing large scale diagnostic screening methods utilizing the polymerase chain reaction (PCR), nucleic acid hybridization, nucleic acid sequencing by hybridization, replicating of viral, bacterial or cellular libraries, as well as any other methods that involve the repetitive arraying of solutions onto solid surfaces.

The biomolecule arrays of the present invention may be probed by tagged biomolecules, for example, oligonucleotides covalently bonded to cleavable tags. These tagged biomolecules may be used in assay procedures, such as oligonucleotide sequencing and gene expression assays, among others. Exemplary tagged biomolecules, and assays which may use the same, are described in U.S. patent application Ser. Nos. 08/786,835; 08/786,834 and 08/787,521, each filed on Jan. 22, 1997, as well as in three U.S. continuation-in-part patent applications having application Ser. Nos. 08/898,180; 08/898,564; and 08/898,501, each filed Jul. 22, 1997; and in PCT International Publication Nos. WO 97/27331; WO 97/27325; and WO 97/27327. These six U.S. Patent Applications and three PCT International Publications are each hereby fully incorporated herein by reference in their entireties.

In addition, the biomolecule arrays of the present invention may contain more than one oligonucleotide sequence within an element (or "first region" in the language of FIG. 1A). Biomolecule arrays containing more than one oligonucleotide sequence within an element, and uses thereof, are described in our U.S. patent application Ser. No. 09/120,688 titled "Multiple Functionalities Within An Array Element And Uses Thereof" filed concurrently herewith, which claims the priority benefit of U.S. Provisional Patent Application No. 60/053,436 filed Jul. 22, 1997, both of which are hereby fully incorporated herein by reference in their entireties.

The biomolecular arrays of the present invention may also be used in performing amplification and other enzymatic reactions, as described in our U.S. patent application Ser. No. 09/120,501 titled "Amplification And Other Enzymatic Reactions Performed On Nucleic Acid Arrays" filed concurrently herewith, which claims the priority benefit of U.S. Provisional Patent Application No. 60/053,428 filed Jul. 22, 1997, both of which are hereby fully incorporated herein by reference in their entireties.

The biomolecule arrays of the present invention may be prepared according to techniques disclosed in our U.S. patent application Ser. No. 09/120,689 titled "Apparatus and Methods For Arraying Solution Onto A Solid Support" filed concurrently herewith, which claims the priority benefit of U.S. Provisional Patent Application No. 60/053,435 filed Jul. 22, 1997, both of which are hereby fully incorporated herein by reference in their entireties.

Computer systems and methods for correlating data, as disclosed in U.S. patent application Ser. No. 09/120, 686 titled "Computer Method and System For Correlating Data" filed concurrently herewith, which claims the priority benefit of U.S. Provisional Patent Application No. 60/053,429 filed Jul. 22, 1997 (both being fully incorporated herein by reference in their entireties) may be used in conjunction with the biomolecule arrays as described herein.

The following examples are offered by way of illustration, not limitation.

EXAMPLES

Example 1

ONE-STEP PROCESS FOR PREPARATION OF PEI-COATED GLASS SLIDE

A glass slide is washed with 0.1 N acetic acid, then rinsed with water until the water rinsed from the slide has a pH equal to the pH of the water being used to rinse the slide. The slide is then allowed to dry.

To a 95:5 ethanol:water solution is added a sufficient quantity of a 50% w/w solution of trimethoxysilylpropyl-polyethylenimine (600 MW) in 2-propanol (Gelest, Inc., Tullytown, Pa., Catalog No. SSP060) to achieve a 2% w/w final concentration. After stirring this 2% solution for five minutes, the glass slide is dipped into the solution, gently agitated for 2 minutes, and then removed. The glass slide is dipped into ethanol in order wash away excess silylating agent. The glass slide is then air dried.

Example 2

ONE-STEP PROCESS FOR PREPARATION OF PEI-COATED SILICON WAFER

A silicon wafer (WaferNet, San Jose. Calif.) is washed with 0.1 N acetic acid, then rinsed with water until the water rinsed from the wafer has a pH equal to the pH of the water being used to rinse the wafer. The wafer is then allowed to dry.

To a 95:5 ethanol:water solution is added a sufficient quantity of a 50% w/w solution of trimethoxysilylpropyl-polyethylenimine (600 MW) in 2-propanol (Gelest. Inc., Tullytown, Pa., Catalog No. SSP060) to achieve a 2% w/w final concentration. After stirring this 2% solution for five minutes, the silicon wafer is dipped into the solution, gently agitated for 2 minutes, and then removed. The wafer is dipped into ethanol in order wash away excess silylating agent. The silicon wafer is then air dried.

Example 3

TWO-STEP PROCESS FOR PREPARATION OF PEI-COATED GLASS SLIDE

A glass slide is washed with 0.1 N acetic acid, then rinsed with water until the water rinsed from the slide has a pH equal to the pH of the water being used to rinse the slide. The slide is then allowed to dry.

To a 95:5 ethanol:water solution is added a sufficient quantity of an electrophilic silylating agent, with stirring to achieve a 2% w/w final concentration. The electrophilic silylating agent is one of 2-(3,4-epoxycyclohexyl) ethyltrimethoxysilane (Gelest, Inc., Catalog No. SIE4670.0), 3,4-epoxybutyltrimethoxysilane (Gelest, Inc., Catalog No. SIE4665.0) or 3-isocyanatopropyltriethoxysilane (Gelest, Inc., Catalog No. SII6454.0). After stirring this 2% solution for five minutes, the glass slide is dipped into the solution, gently agitated for 2 minutes, and then removed. The glass slide is dipped into ethanol in order wash away excess silylating agent.

A 3% (w/v) solution of 70,000 molecular weight poly (ethylenimine) is prepared by diluting a 30% aqueous solution of poly(ethylenimine) (Polysciences, Warrington, Pa.) with 1-methyl-2-pyrrolidone (NMP). The treated glass slide is dipped into the 3% solution and gently agitated for 24 hours. In order to remove excess PEI from the slide, the glass slide is dipped into NMP) (2×), followed by dipping into a 0.1% aqueous solution of sodium dodecyl sulfate also containing 0.09 M NaCl, 50 mM Tris pH 7.6 and 25 mM EDTA (2×), then dipping into water (2×), and finally dipping into ethanol (1×). The glass slide is then allowed to air dry.

Example 4

TWO-STEP PROCESS FOR PREPARATION OF PEI-COATED SILICON WAFER

A silicon wafer (WaferNet, San Jose, Calif.) is washed with 0.1 N acetic acid as described in Example 3, following by treatment with a silylating agent and PEI, also as described in Example 3.

Example 5

PREPARATION OF ARRAYING TIP FROM A COMMERCIAL SPRING PROBE

XP54P springy probes were purchased from Osby-Barton (a division of Everett Charles (Pomona, Calif.)). A probe was directed "tip-down" against an extra fine diamond sharpening stone (DMT Inc., Miami Lattes, Fla.) and moved across the stone for a distance of about 0.5 cm with gentle pressure. Approximately 0.005 inches (0.001 to 0.01 inches) of metal was thereby removed from the end of the tip as observed by microscopy. The tip end was then polished by rubbing the tip across a leather strip. The tip was then washed with water. Before initial use, or between uses, the tip was stored dry or in 50% glycerol at −20° C.

Example 6

ASSEMBLY OF ARRAYING DEVICE WITH MODIFIED SPRING PROBE

The tip as prepared in Example 5 was mounted into an arraying head mounted on a precision robotic system which can be controlled in the x, y and z axis. The precision Cartesian robotic system consists a of linear positioning table coupled with the appropriate motors, amplifiers, motion controller, personal computer and software to drive the tables. Precision linear positioning tables are available from Parker Hannifin Corporation (Daedel Division, Harrison City, Pa.) or THK Company, Ltd. (Tokyo, Japan). Motors, amplifiers, and motion controllers are available from Parker Hannifin Corporation (Daedel Division, Harrison City, Pa.) or Galil Motion Control, Inc. (Mountain View, Calif.).

Example 7

THE USE OF A HYDROPHILIC SURFACE TO PROMOTE LIQUID PICKUP, LIQUID TRANSFER AND MICRO-DROPLET DEPOSITION

The tip of a spring probe according to Example 5 is soaked in a solution of 100 mM 1,4-dithiothreitol and 0.1 M sodium borate for 60 minutes. Dithiothreitol will react with a gold surface through thiol-gold coordination to make the surface of the gold hydrophilic (the surface is essentially hydroxylated).

Example 8

PREPARATION OF REACTIVE OLIGONUCLEOTIDE

75 $\mu$l of a solution of 5'-hexylamine-GTCATACTCCTGCTTGCTGATCCACATCTG-'3 (SEQ ID NO: 1) (0.5 $\mu$g/$\mu$l) was reacted with 5 $\mu$l of 20 mg/ml cyanuric chloride and 20 $\mu$l of 1M sodium borate for 30 minutes at room temperature.

Example 9

ARRAYING SOLUTION OF OLIGONUCLEOTIDE

An arraying solution was prepared which consists of 12.5 $\mu$l 1 M sodium borate pH 8.3 (freshly prepared or thawed from a stock at −20° C.), 50 $\mu$l 0.1 $\mu$g/$\mu$L 5' hexylamine oligonucleotide (5' hexylamine-GTCATACTCCTGCTTGCTGATCCACATCTG-3') (SEQ ID NO: 1), 7.5 $\mu$L of 15 mg/ml cyanuric chloride in acetonitrile. This mixture was allowed to incubate at room temperature for 30 to 60 minutes. 155 $\mu$L of 80% glycerol was then added to the solution and the resulting solution was mixed well. In some cases, 15 $\mu$L of 10% NP-40 or 10% Tween-20 or 10% Triton X-100 (Rohm and Haas, Philadelphia, Pa.) is added to the solution. When the arraying substrate is composed of nylon or nitrocellulose membranes, 25 $\mu$L of 5 M NaCl is added to the arraying solution.

Example 10

ARRAYING SOLUTION OF PCR AMPLICONS

When PCR amplicons are to be arrayed, 2.5 $\mu$L 1 M sodium borate pH 8.3 (freshly prepared or thawed from a stock at −20° C.), 50 $\mu$l 0.1 $\mu$g/$\mu$L 5' hexylamine oligonucleotide (5' hexylamine-GTCATACTCCTGCTTGCTGATCCACATCTG-3') (SEQ ID NO: 1), 7.5 $\mu$L of 15 mg/mL cyanuric chloride in acetonitrile are added to the PCR tube containing the PCR contents after the thermocycling step is complete. This mixture is allowed to incubate at room temperature for 30 to 60 minutes. 155 $\mu$L of 80% glycerol is then added to the solution and the resulting solution is mixed well. In some cases 15 $\mu$L of 10% NP-40, or 10% Tween-20 or 10% Triton X-100 is added to the solution. When the arraying substrate is composed of nylon or nitrocellulose membranes, 25 $\mu$L of 5 M NaCl is added to the arraying solution.

Example 11

PREPARATION OF ARRAYED OLIGONUCLEOTIDES

The modified spring probe of Example 5 is positioned in a robotic delivery device according to Example 6, and the spring probe tip is conditioned according to Example 7. The tip is submerged 5 millimeters into the arraying solution of Example 9 for 2 seconds. The solution-bearing tip is then used by the robot to print 72 microspots in a 12×6 grid onto a polyethylenimine (PEI) coated silicon wafer prepared according to any of Examples 2, 4, or as provided by Cell Associates Houston, Tex.) or the like, who will prepare PEI-coated substrates under contract. The spots produced were approximately 100–150 microns in diameter with 200 microns between the centers of neighboring spots.

Example 12

BLOCKING OF ACTIVE PEI SITES

The array of Example 11 is treated with 100 mg/ml, succinic anhydride in 100% NMP for 15 minutes, in order to block unreacted PEI sites on the array. This was followed by a water wash (3×).

Example 13

BLOCKING OF UNREACTED CYANURIC CHLORIDE SITES

The array of Example 12 is treated with 0.1 M glycine in 0.01 M Tris for 15 minutes, followed by 4 washes with Tens (0.1 M NaCl, 0.1% SDS, 0.01 M Tris, 5 mM EDTA), in order to block unreacted cyanuric chloride sites on the array.

Example 14

HYBRIDIZATION PROCESS

The immobilized oligonucleotides in the array of Example 13 were hybridized to their biotinylated complement (5'-BIOTIN-TGTGGATCAGCAAGCAGGAGTATG-3') (SEQ ID NO: 2) for 20 minutes at 37° C. with a 6× Tens, 2× OHS (0.06 M Tris, 2 mM EDTA), 5× Denhardt's solution, 6× SSC (3 M NaCl, 0.3 M sodium citrate, pH 7.0), 3.68 mM N-lauroylsarcosine, 0.005% NP-40) wash.

Figure 5:
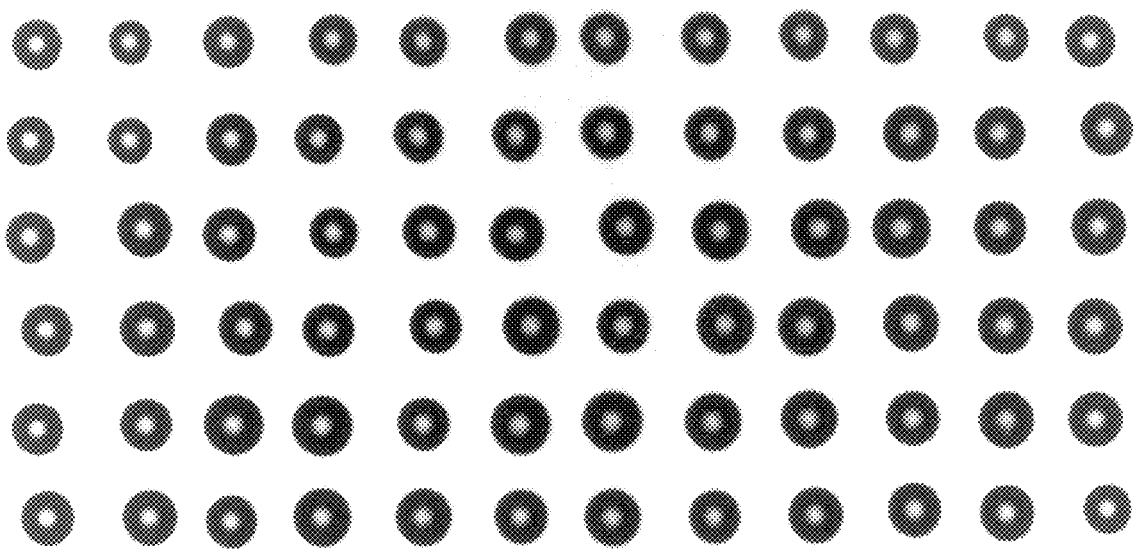
FIG. 5 shows an array of microspots prepared according to the invention and developed using Vector Blue (Vector Laboratories, Burlingame, Calif.) and imaged with a CCD camera and microscope.

Following hybridization, the wafer was soaked in 0.5 μg/ml alkaline phosphatase streptavidin for 15 minutes with a 2× Tens, 4× TWS (0.1 M NaCl, 0.1% Tween 20, 0.05 M Tris) wash. The microspots were then developed using Vector Blue (Vector Laboratories, Burlingame, Calif.) (following kit protocol) and imaged with a CCD camera and microscope. FIG. 5 displays the image generated.

Example 15

MULTIPLE OLIGOS WITHIN A SINGLE ARRAY ELEMENT

Two template oligos (SEQ ID NOS: 2 and 3 respectively) (oligo #1=5'-hexylamine-TGTGGATCAGCAAGCAGG AGTATG-3', oligo #2=5'-hexylamine- ACTACTGATCAGGCGCGCCTT TTTTTTTTTTTTTTTTT-3') both concentrated at 0.5 μg/μl were reacted separately with 5 μl of 20 mg/ml cyanuric chloride an 20 μl of 1M sodium borate for 30 minutes at room temperature (total reaction volume=100 μl). From these two reactions, arraying solutions were made which consisted of 56% glycerol and diluted combinations of the two oligos (see Table 1). Eight arraying tips were submerged 5 millimeters into each of the eight arraying solutions for 2 seconds. The solution-bearing tips were then used by a robot to print two sets of eight 12×6 grids each containing 72 microspots onto a polyethylenimine (PEI) coated silicon wafer. Each grid represents a single arraying solution. The spots produced were approximately 100–150 microns in diameter with 200 micron center to center spacing between spots.

Following arraying, the unreacted PEI sites on the wafer were blocked with 100 mg/ml succinic anhydride in 100% N-methyl pyrrolinidone for 15 minutes with a 3× water wash. The unreacted cyanuric chloride sites were blocked with 0.1 M glycine in 0.01 M Tris for 15 minutes with a 4× Tens (0.1 M NaCl, 0.1% SDS, 0.01 M Tris, 5 mM EDTA) wash. Two hybridizations were then carried out.

In the first hybridization, one set of the eight arrayed oligo combinations was hybridized to the biotinylated oligo (5'-BIOTIN-TGTGGATCAGCAAGCAGGAGTATG-3') (SEQ ID NO: 2) complementary to oligo #1. In the second hybridization, the other set of the eight arrayed oligo combinations was hybridized to the biotinylated oligo (5'-BIOTIN- AAAAAAAAAAAAAAAAAAAAGGCGCGCCTGATC-AGTAGT) (SEQ ID NO: 4) complementary to oligo #2. The hybridizations were conducted simultaneously under Hybri-well Sealing Covers (Research Products International Corporation, Mount Prospect, Ill.) for 20 minutes at 37° C. with a 6× Tens, 2× OHS (0.06 M Tris, 2 mM EDTA), 5× Denhardt's solution, 6× SSC (3 M NaCl, 0.3 M sodium citrate, pH 7.0), 3.68 mM N-lauroylsarcosine, 0.005% NP-40) wash.

Following hybridization, the wafer was soaked in 0.5 μg/ml horseradish peroxidase streptavidin for 15 minutes with a 2× Tens, 4× TWS (0.1 M NaCl, 0.1% Tween 20, 0.05 M Tris) wash. The microspots were then developed using 0.4 mg/ml 4-methoxyl-1-napthol (0.02% hydrogen peroxide, 12% methanol, PBS) with a final 3× water wash.

Figure 6:
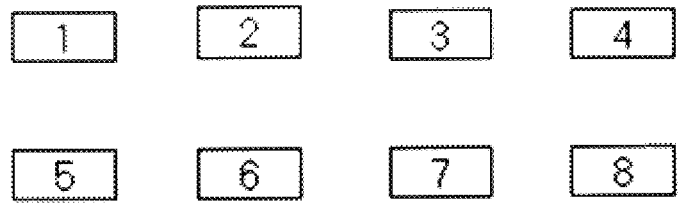
FIG. 6 is an illustration showing how two different oligonucleotides, both present within a single array element may be identified and partially quantified according to the present invention.
Figure 6:
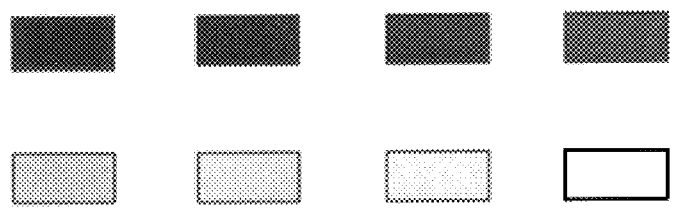
Figure 6:
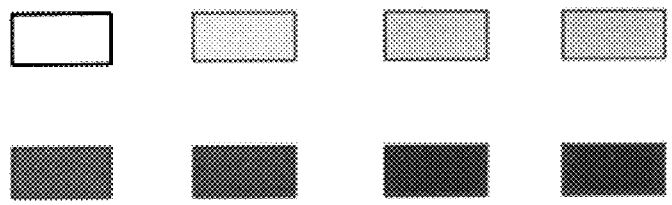

The set of mixed oligos hybridized to the complement of oligo #1, showed the greatest color intensity for the grid containing the highest concentration of oligo #1 and the least color intensity with the grid containing the lowest concentration of oligo #1. However, the set of mixed oligos hybridized to the complement of oligo #2, showed the greatest color intensity for the grid containing the highest concentration of oligo #2 and the least color intensity with the grid containing the lowest concentration of oligo #2 (see FIG. 6).

TABLE 1

| Arraying Solution | Concentration of oligo in arraying solution (ng/μl) Oligo #1 | Concentration of oligo in arraying solution (ng/μl) Oligo #2 |
| --- | --- | --- |
| 1 | 56 | 0.44 |
| 2 | 28 | 0.88 |
| 3 | 14 | 1.8 |
| 4 | 7 | 3.5 |
| 5 | 3.5 | 7 |
| 6 | 1.8 | 14 |
| 7 | 0.88 | 28 |
| 8 | 0.44 | 56 |

Example 16

DETERMINING ELEMENT SIZE CONSISTENCY

Figure 7:
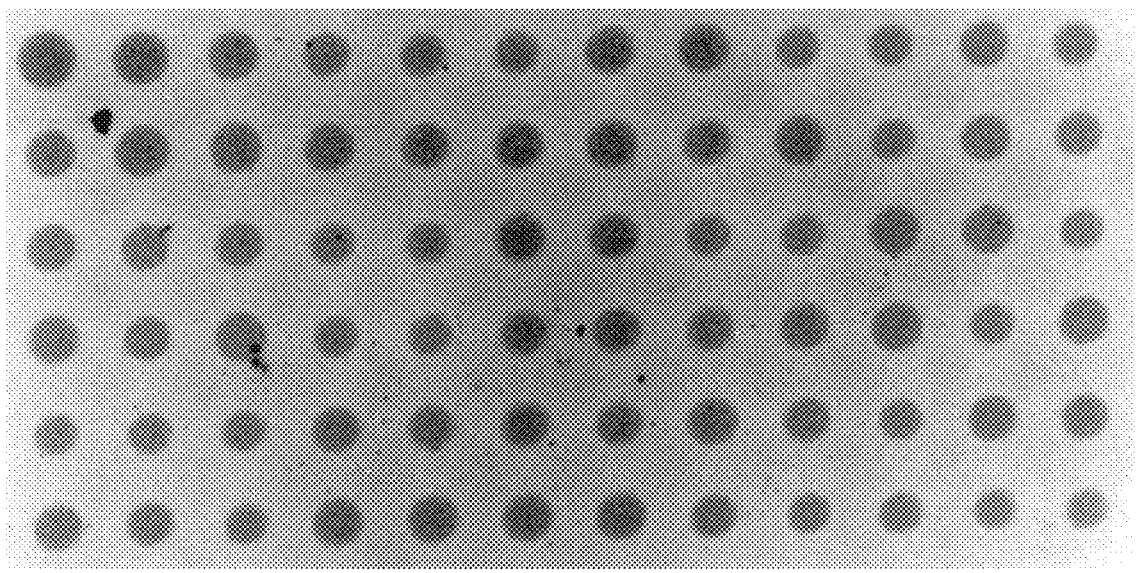
FIG. 7 shows a CCD camera image of an array produced by a robot using the methodology of the invention, where the domains are approximately 100–150 microns in average diameter with 200 micron center to center spacing between spots. The standard deviation of spot diameter is approximately 15%.

An arraying solution was made which consists of 56% glycerol and 44% water colored with blue food color. The arraying tip was submerged 5 millimeters into the arraying solution for 2 seconds. The glycerol bearing tip was then used by a robot to print 72 microspots in a 12×6 grid onto a silicon wafer. The spots produced were approximately 100–150 microns in diameter with 200 micron center to center spacing between spots. FIG. 7 shows a CCD camera image of the grid produced by the robot. The standard deviation of spot diameter is approximately 15%.

Example 17

DETERMINING REPRODUCIBILITY WITHIN ARRAYING PROCESS

Figure 8:
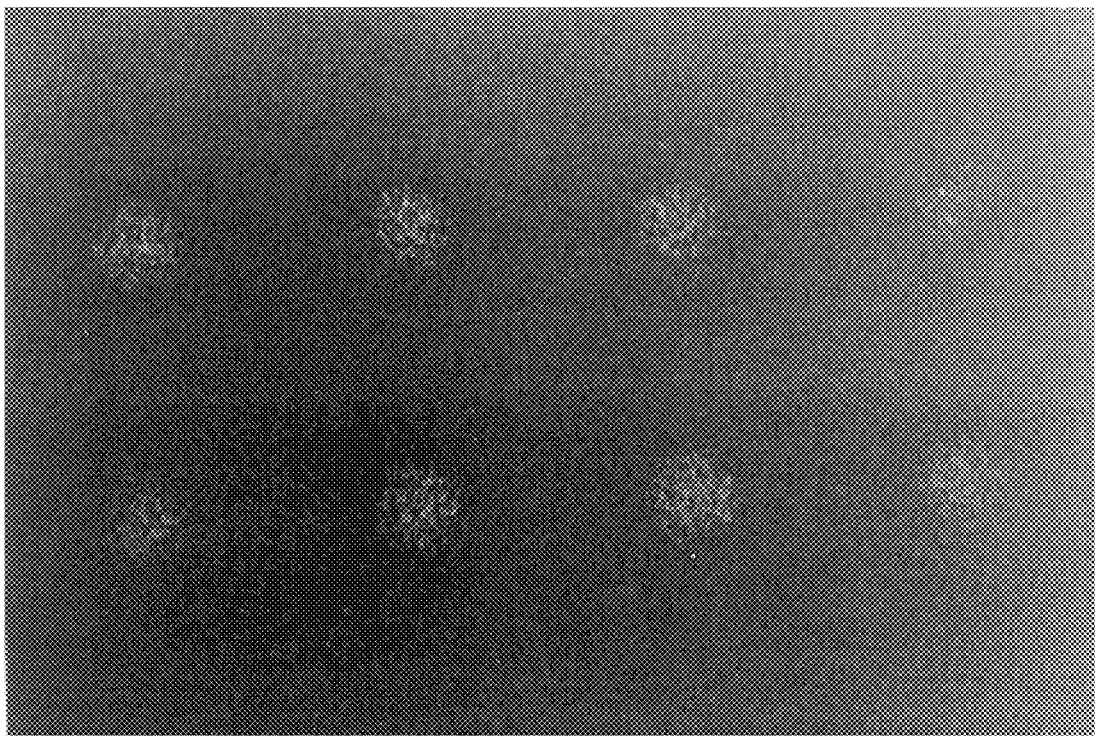
FIG. 8 is a photomicrographs made under fluorescence light using a filter for fluorescence, which demonstrates the reproducible deposition (as determined by visual inspection) of non-vehicle components (in this case, fluorescent microspheres) delivered from an assaying solution.

An arraying solution was made which consists of 56% glycerol, 0.01 M Tris pH 7.2, 5 mm EDTA, 0.01% Sarkosyl, and 1% V/V Fluoresbrite Plain 0.5 μM microspheres (2.5% Solids-latex), (Polysciences, Warrington, Pa.). The arraying pin was submerged 5 millimeters into the solution for 5 seconds and then used to print multiple microspots onto a glass slide. Photomicrographs were then made under fluorescence light using a filter for fluorescence. FIG. 8 demonstrates very reproducible deposition (as determined by visual inspection) of the fluorescent microspheres with each of the microspots (array elements).

Example 18

DETERMINING NUCLEIC ACID POLYMER CONCENTRATION PER ELEMENT

Oligonucleotide (5'-Texas Red-CAGATGTGGATCAGCAAGCAGGAGTATGAC) (SEQ ID NO: 5) complementary to arrayed oligonucleotide was hybridized to the array in 3 M guanidinium thiocyanate (GuSCN) 0.01 M Tris, pH 7.5, 5 mM EDTA and 0.1% Sarkosyl. The volume was sufficient to cover the solid support (1 mL for a glass slide (1×3 inches)). The concentration of the Texas Red oligonucleotide was 5 µg/ml and the reaction was carried out at room temperature. The hybridization was allowed to proceed for 30 minutes. The slide was then washed with Tens (5×). The slide was then covered with 1 mL of elution buffer (0.005 MV Tris pH 7.6, 0.0005 M EDTA, 0.01% Sarkosyl) and heated to 95° C. for 2 minutes. The solution was removed from the slide and placed into a black microtiter plate. Fluorescence was measured in a black microtiter plate. The solution was removed from the incubation tubes (200 µL) and placed in a black microtiter plate (Dynatek Laboratories, Chantilly. Va.). The plates were then read directly using a Fluoroskan II fluorometer (Flow Laboratories McLean, Va.) using an excitation wavelength of 495 nm and monitoring emission at 520 nm for fluorescein, using an excitation wavelength of 591 nm and monitoring emission at 612 nm for Texas Red, and using an excitation wavelength of 570 nm and monitoring emission at 590 nm for lissamine or TAMRA. The quantity of eluted oligonucleotide was determined by dividing the amount of measured fluorescence (3.84 relative fluorescence units (rfus)) by the specific activity of the Tex. Red oligonucleotide (6.9 rfu per µg of oligonucleotide). It was therefore determined that $10^8$ oligonucleotides were present per element in the array.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. An array of biomolecules comprising:
a solid substrate comprising a surface;
said surface at least partially covered with a continuous layer comprising poly(ethylenimine) (PEI);
said continuous layer comprising a plurality of discrete first regions and a second region, the discrete first regions surrounded by, separated from one another by, abutting, and contiguous with, the second region;
said first regions defined by the presence of biomolecule and the PEI;
said second region defined by the presence of the PEI and the substantial absence of biomolecule.

2. The array of claim 1 wherein said substrate is a glass plate.

3. The array of claim 1 wherein said substrate is a silicon wafer.

4. The array of claim 1 wherein said substrate comprises a material selected from the group consisting of glass, quartz silicon, gold, nylon-6,6, nylon and polystyrene.

5. The array of claim 1 wherein said PEI has a molecular weight ranging from 100 to 100,000.

6. The array of claim 1 wherein a reaction product of a bifunctional coupling agent is disposed intermediate to said surface and said PEI coating, said reaction product being covalently bonded to said surface and said PEI coating.

7. The array of claim 6 wherein said bifunctional coupling agent comprises a first and a second reactive functional group, said first reactive functional group being a tri(O—$C_1$–$C_5$alkyl)silane and said second reactive functional group being selected from the group consisting of epoxide isocyanate, isothiocyanate and anhydride.

8. The array of claim 7 wherein said bifunctional coupling agent is selected from the group consisting of 2-(3,4-epoxycyclohexyl)ethyltrimethoxysilane; 3,4-epoxybutyltrimethoxysilane; 3-isocyanatopropyltriethoxysilane, 3-(triethoxysilyl)-2-methylpropylsuccinic anhydride and 3-(2,3-epoxypropoxy) propyltrimethoxysilane.

9. The array of claim 1 wherein each of said first regions is defined by an area within the range of about 1,000 microns to about 100,000 microns.

10. The array of claim 1 wherein said area ranges from about 5,000 microns to about 25,000 microns.

11. The array of claim 1 wherein each of said first regions is substantially circular.

12. The array of claim 11 wherein said first regions have an average diameter of about 10 microns to 200 microns.

13. The array of claim 1 wherein said first regions are separated from one another by an average distance of at least about 25 microns.

14. The array of claim 1 wherein neighboring said first regions are separated by an average distance of no more than about 1 cm.

15. The array of claim 1 wherein neighboring said first regions are separated by an average distance of no more than about 1,000 microns.

16. The array of claim 1 wherein neighboring said first regions are separated by an average distance of about 25 microns to 100 microns.

17. The array of claim 1 wherein said first regions are positioned in a repeating geometric pattern.

18. The array of claim 17 wherein said first regions are approximately equal distance from one another.

19. The array of claim 18 wherein said distance is about 25 microns to about 100 microns.

20. The array of claim 17 wherein said pattern comprises circular first regions, said circular first regions having an average diameter of about 100 to about 1,000 microns.

21. The array of claim 1 having 10 to 50 first regions.

22. The array of claim 1 having 50 to 400 first regions.

23. The array of claim 1 having 400 to 800 first regions.

24. The array of claim 1 wherein said biomolecule is selected from the group consisting of nucleic acid polymers.

25. The array of claim 24 wherein said biomolecule is an oligonucleotide having from about 15 to about 50 nucleotides.

26. The array of claim 24 wherein said nucleic acid polymer is an amplification reaction product having from about 50 to about 1,000 nucleotides.

27. The array of claim 1 wherein said biomolecule is present in said first regions at an average concentration ranging from $10^5$ to $10^9$ biomolecules per 2,000 square microns of a first region.

28. The array of claim 27 wherein said average concentration ranges from $10^7$ to $_{10}{}^9$ biomolecules per 2,000 square microns.

29. The array of claim 1 wherein said biomolecule is present in said second region at an average concentration of less than $10^3$ biomolecules per 2,000 square microns of said second region.

30. A process for preparing an array of biomolecules, said process comprising:
providing a solid substrate comprising a surface, wherein a continuous layer of poly(ethylenimine) (PEI) covers at least a portion of said surface, said continuous layer comprising a plurality of discrete first regions and a second region, the discrete first regions surrounded by, separated from one another by, abutting, and contiguous with, the second region; and depositing arraying solution into said first regions, said arraying solution comprising biomolecule and thickening agent, while maintaining said second region substantially free of the biomolecule.

31. The process of claim 30 wherein said substrate is a glass plate.

32. The process of claim 30 wherein said substrate is a silicon wafer.

33. The process of claim 30 wherein said substrate comprises a material selected from the group consisting of glass, quartz, silicon, nylon, polystyrene and gold.

34. The process of claim 30 wherein said PEI has a molecular weight ranging from 100 to 100,000.

35. The process of claim 30 wherein a reaction product of a bifunctional coupling agent is disposed intermediate to said surface and said PEI coating, said reaction product being covalently bonded to said surface and said PEI coating.

36. The process of claim 35 wherein said bifunctional coupling agent comprises a first and a second reactive functional group, said first reactive functional group being a tri(O—$C_1$—$C_5$alkyl)silane and said second reactive functional group being selected from the group consisting of epoxide, isocyanate, isocyanato and anhydride.

37. The process of claim 36 wherein said bifunctional coupling agent is selected from the group consisting of 2-(3,4-epoxycyclohexyl)ethyltrimethoxysilane; 3,4-epoxybutyltrimethoxysilane; 3-isocyanatopropyltriethoxysilane, 3-(triethoxysilyl)-2-methylpropylsuccinic anhydride and 3-(2,3-epoxypropoxy)propyltrimethoxysilane.

38. The process of claim 30 wherein each of said first regions is defined by an area within the range of about 1,000 microns to about 100,000 microns.

39. The process of claim 30 wherein said area ranges from about 5,000 microns to about 25,000 microns.

40. The process of claim 30 wherein each of said first regions is substantially circular.

41. The process of claim 40 wherein said first regions have an average diameter of about 10 microns to 200 microns.

42. The process of claim 30 wherein said first regions are separated from one another by an average distance of at least about 25 microns.

43. The process of claim 30 wherein neighboring said first regions are separated by an average distance of no more than about 1 cm.

44. The process of claim 30 wherein neighboring said first regions are separated by an average distance of no more than about 1,000 microns.

45. The process of claim 30 wherein neighboring said first regions are separated by an average distance of about 25 microns to 100 microns.

46. The process of claim 30 wherein said first regions are positioned in a repeating geometric pattern.

47. The process of claim 46 wherein said first regions are approximately equal distance from one another.

48. The process of claim 47 wherein said distance is about 25 microns to about 100 microns.

49. The process of claim 46 wherein said pattern comprises circular first regions, said circular first regions having, an average diameter of about 100 to about 1,000 microns.

50. The process of claim 30 having 10 to 50 first regions.

51. The process of claim 30 having 50 to 400 first regions.

52. The process of claim 30 having 400 to 800 first regions.

53. The process of claim 30 wherein said biomolecule is a nucleic acid polymer.

54. The process of claim 53 wherein said biomolecule is an oligonucleotide having from about 15 to about 50 nucleotides.

55. The process of claim 53 wherein said nucleic acid polymer is an amplification reaction product having from about 50 to about 1,000 nucleotides.

56. The process of claim 30 wherein said biomolecule is deposited in said first regions to provide an average concentration ranging from $10^5$ to $10^9$ biomolecules per 2,000 square microns of a first region.

57. The process of claim 56 wherein said average concentration ranges from $10^7$ to $10^9$ biomolecules per 2,000 square microns.

58. The process of claim 30 wherein said biomolecule is present in said second region at an average concentration of less than $10^3$ biomolecules per 2,000 square microns of said second region.

59. The process of claim 30 wherein said depositing a biomolecule comprises transferring nucleic acid polymer on the tip of a spring probe.

60. The process of claim 30 wherein said depositing a biomolecule comprises jetting nucleic acid polymer from an ink jet printhead.

* * * * *

UNITED STATES PATENT AND TRADEMARK OFFICE
CERTIFICATE OF CORRECTION

PATENT NO. : 6,150,103
DATED : November 21, 2000
INVENTOR(S) : Ness et al.

Page 1 of 1

It is certified that error appears in the above-identified patent and that said Letters Patent is hereby corrected as shown below:

Column 22, claim 28,
Line 56, "$10^9$" should read -- $10^9$ --.

Signed and Sealed this

Twenty-third Day of October, 2001

Attest:

*Nicholas P. Godici*

NICHOLAS P. GODICI
*Attesting Officer*     *Acting Director of the United States Patent and Trademark Office*